Oct. 11, 1932. J. PARIS 1,882,160
DOUGH MOLDING MACHINE
Filed April 9, 1931 2 Sheets-Sheet 2
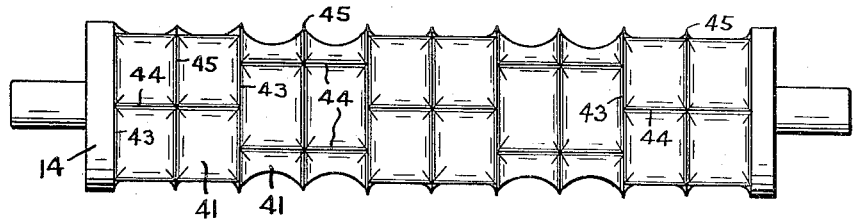
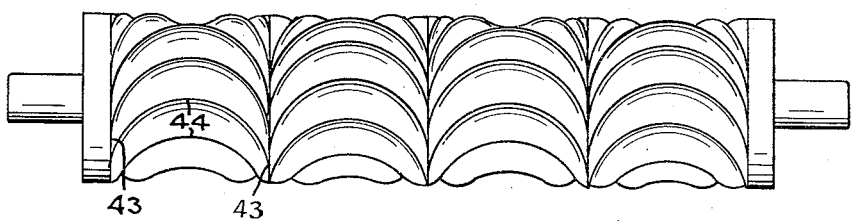
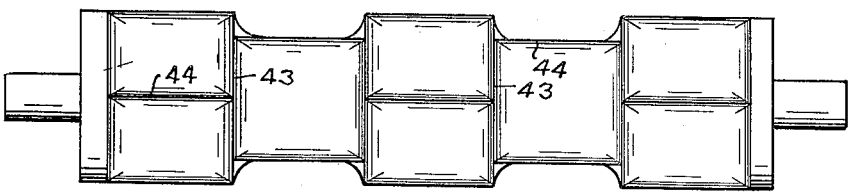
INVENTOR.
JEAN PARIS.
BY
*H.C. Karel*
ATTORNEY.

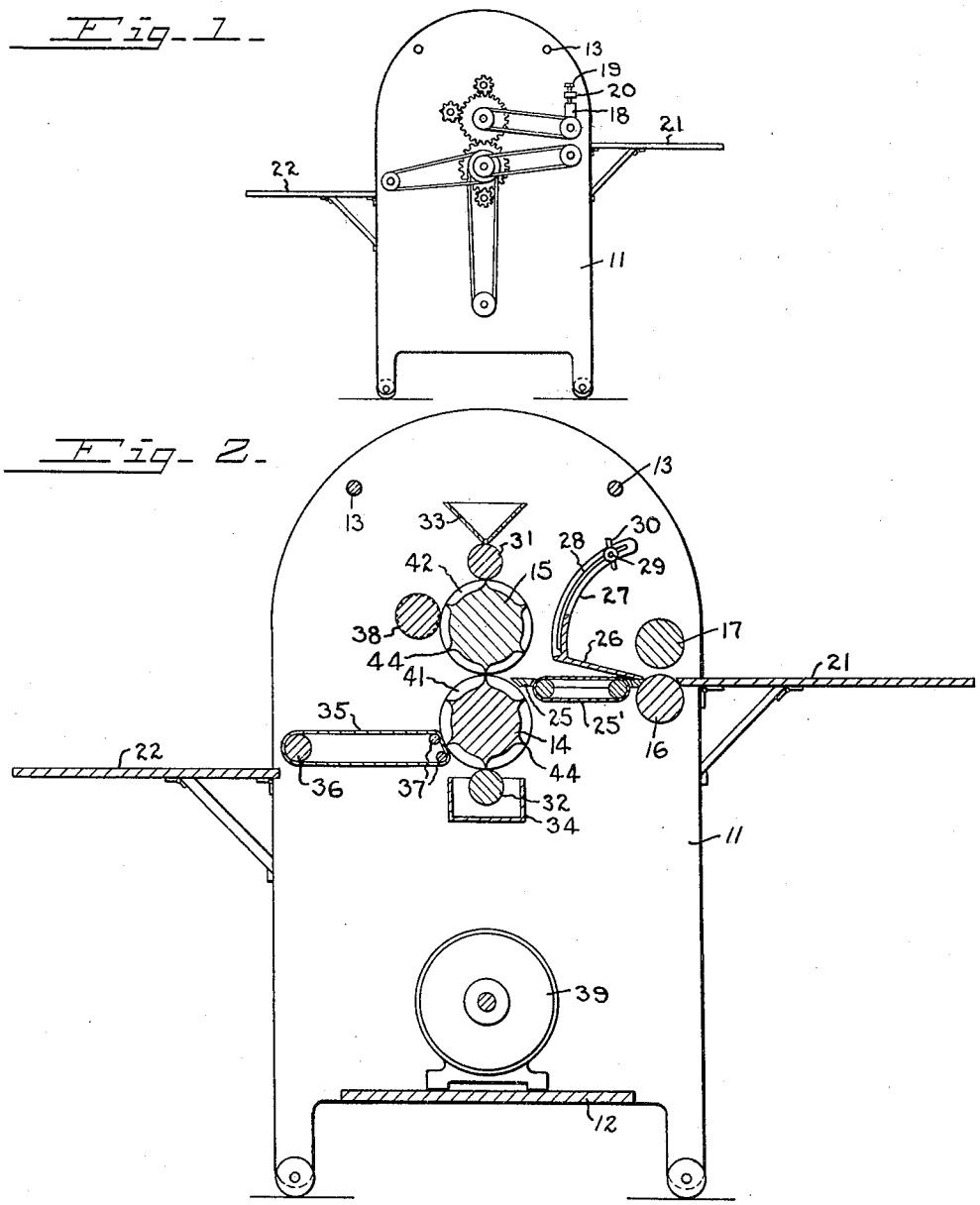

Patented Oct. 11, 1932

1,882,160

UNITED STATES PATENT OFFICE

JEAN PARIS, OF CINCINNATI, OHIO

DOUGH MOLDING MACHINE

Application filed April 9, 1931. Serial No. 528,769.

My invention relates to a dough molding machine and especially to a pair of forming rollers for the purpose of forming and cutting various shaped biscuits, rolls, bread, etc.

Heretofore, it has been the usual practice to run the dough through a molding machine for the purpose of kneading and stretching the dough to prepare it for baking, and to then cut it by hand operated means into the desired shape or size.

In my improved machine, I provide a pair of forming and cutting rollers, which receive the dough from the kneading rollers and form and cut the desired shaped biscuits or rolls. Various shaped rollers may be placed in the machine to cut rolls or biscuits to any desired shape.

The object of my invention is to provide a machine having suitable kneading rollers and a pair of forming rollers which shape and cut the dough into suitable shaped biscuits. A further object is to provide a pair of co-acting rollers having recesses in their periphery for the purpose of forming and cutting various shaped dough biscuits. A further object is to provide the adjacent recesses in the rollers in staggered relation in order to prevent complete severance of the dough at any one point throughout the contacting faces of the rollers. Still further objects reside in the novel construction of the rollers.

The invention will be further readily understood from the following description and claim, and from the drawings, in which latter:

Fig. 1 is a side view of the molding machine.

Fig. 2 is a vertical cross section of the same.

Fig. 3 is an enlarged view of one form of forming roller.

Fig. 4 is a similar view of another form of roller, and

Fig. 5 is a similar view of still another form of roller.

The machine exemplified in the drawings is of a conventional design and comprises side walls 11 provided with a shelf 12, adjacent to the base thereof, and a pair of connecting rods 13 near the upper end thereof to secure the side walls together. A pair of rollers 14 and 15 are suitably journaled in the side walls and are hereafter more fully described.

A pair of kneading rollers 16 and 17 are arranged in a horizontal plane with the rollers 14 and 15. The roller 17 is adjustable up and down for the purpose of gaging the correct thickness of the rolled dough. This adjustment may be provided by having the bearings mounted in movable brackets 18, adjustable by means of suitable bolts 19, received in lugs 20 in the side frame members. Suitable tables 21 and 22 are hinged to the respective ends of the machine and may be dropped down when not in use, whereby the machine will take up a minimum of floor space. The table 21 has its plane surface in line with the top of the roller 16 for the purpose of feeding the dough to the rollers 16 and 17.

A shelf 25 is positioned between the rollers 16 and 14, whereby the dough being fed through the rollers 16 and 17 will be pushed forward to the rollers 14 and 15 aided by a belt 25' received over suitable pulleys mounted on the shelf.

If it is desired to run the dough through the rollers 16 and 17 more than once before it is contacted by the rollers 14 and 15, a take off shelf 26 is lowered into position, whereby the dough, after passing through the rollers 16 and 17 will accumulate on the shelf and can be lifted back to the rerun through the rollers. This shelf is provided with arcuate arms 27 having arcuate slots 28 therein. Studs 29 are received in the arcuate slots and are provided with thumb nuts 30 for the purpose of locking the arms to the side walls of the machine. When it is desired to dispense with the use of the shelf 26, the thumbnuts 30 are loosened and the shelf is raised to prevent interference of the shelf with the dough passing through the rollers. Suitable dusting or oiling rollers 31 and 32 are arranged above and below the forming rollers for the purpose of coating the rollers, to prevent the dough from adhering thereto.

These rollers 31 and 32 have cooperating dusting boxes 33 and 34. A belt conveyor 35, is mounted on suitable rollers 36 and 37 for the purpose of conveying the formed dough biscuits from the forming rollers to the table 22. A ribbed roller 38 has contact with the forming roller 15 for releasing any formed biscuit that might cling to the roller 15 after it has been formed and cut. A suitable electric motor 39, is mounted on the shelf 12 providing motive power to the various rollers and the conveyor. The rollers 16 and 17 rotate at the same speed as the rollers 14 and 15, while the conveyor 35 and the ribbed roller 38 travel at a greater speed than the rollers 14 and 15 to aid in releasing the formed product from the forming rollers 14 and 15.

The machine exemplified is of conventional design and may be made or built in various ways but my invention resides in the novel forming and cutting rollers, which I will now more fully describe.

The rollers 14 and 15 have co-acting recesses 41 and 42. The recesses in the roller 14 are slightly deeper than the recesses in the roller 15 for the purpose of preventing the dough from clinging to the upper roller. These recesses in the rollers 14 and 15 may be of various sizes and shapes to form dough products of various sizes and shapes.

In Figs. 3 to 5 inclusive, I have shown three different forms of rollers for forming different kinds of dough products. The recesses in the rollers have curved edges and sharp contacting points between the various forms for severing the dough and forming individual dough products. In the roller shown in Fig. 3, the recesses are formed for the purpose of cutting creased rolls and has cutting edges 43 and 44 with an edge 45 of slightly less diameter for creasing the roll, but not of sufficient diameter to cut the roll in half. Likewise in Fig. 4, I have shown a roll for the purpose of forming crescent shaped biscuits and in Fig. 5, I have shown a roller for forming buns. The adjacent forms on each roller are staggered to prevent complete severance of the dough passing through the rollers at any one point.

This same device can be adapted for use in cutting loaves of bread and for such use, the rollers 14 and 15 would be or larger diameter and consequently the recesses would be of a different shape and of greater depth.

Having thus fully described my invention, what I claim as new and desire to secure by Letters Patent, is:

In a dough molding machine the combination of means for rolling dough, a pair of cooperating rollers provided with a plurality of staggered indentations having parallel cutting edges lengthwise said rollers, creasing edges transverse said rollers alternating with transverse cutting edges and means for releasing the cut dough from said rollers.

In testimony whereof I have hereunto signed my name.

JEAN PARIS.